May 17, 1932.  A. C. W. ALDIS  1,858,353
APPARATUS FOR USE IN CONNECTION WITH PHOTOGRAPHIC AERIAL SURVEYS
Filed Feb. 26, 1930  6 Sheets-Sheet 1
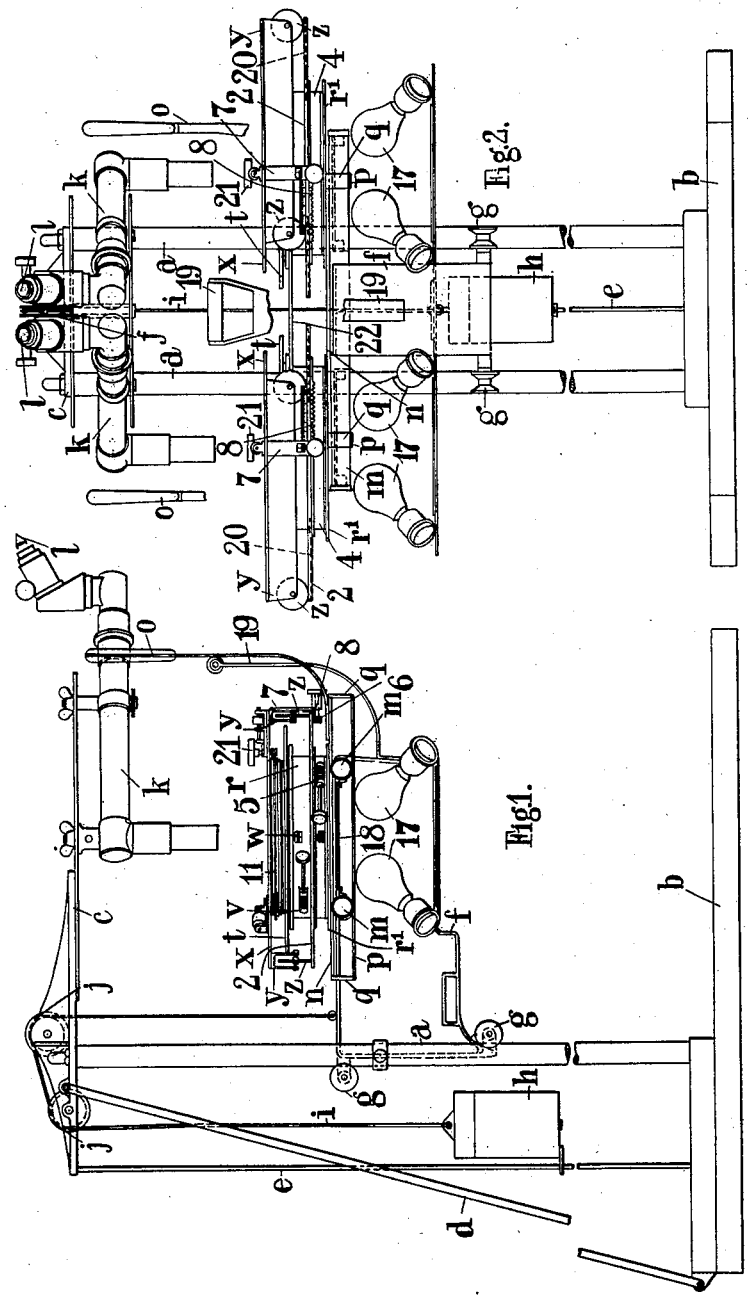

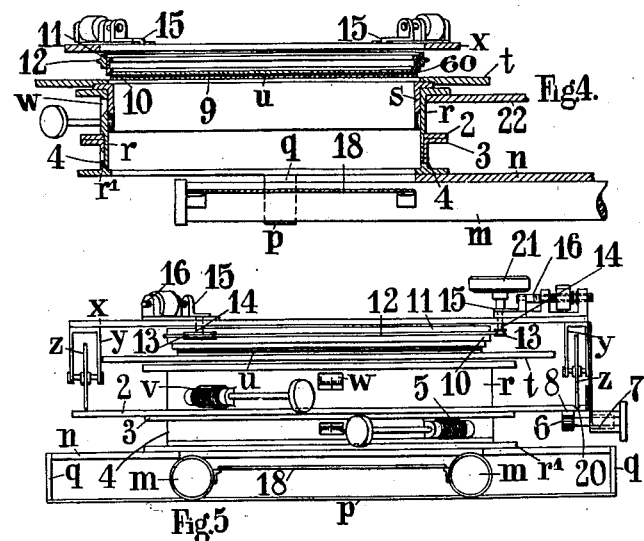
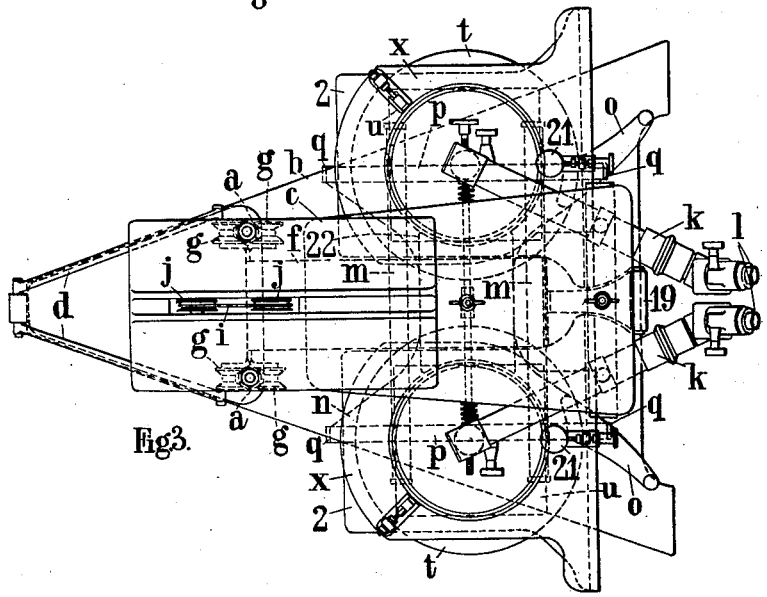

May 17, 1932. A. C. W. ALDIS 1,858,353
APPARATUS FOR USE IN CONNECTION WITH PHOTOGRAPHIC AERIAL SURVEYS
Filed Feb. 26, 1930 6 Sheets-Sheet 4

A.C.W. Aldis
INVENTOR

By Marks & Clerk
Attys.

May 17, 1932.  A. C. W. ALDIS  1,858,353
APPARATUS FOR USE IN CONNECTION WITH PHOTOGRAPHIC AERIAL SURVEYS
Filed Feb. 26, 1930    6 Sheets-Sheet 5
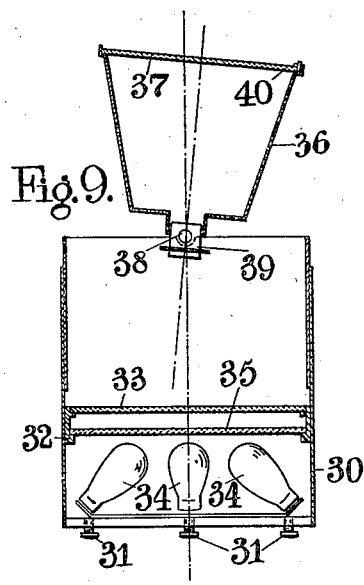
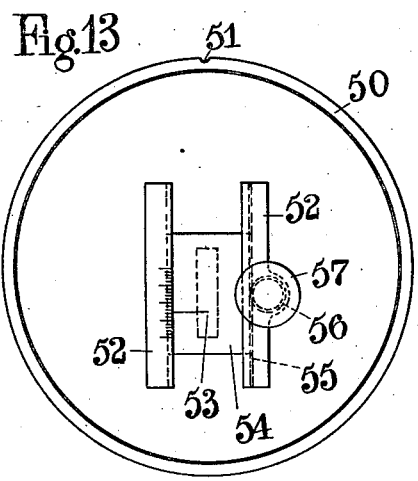

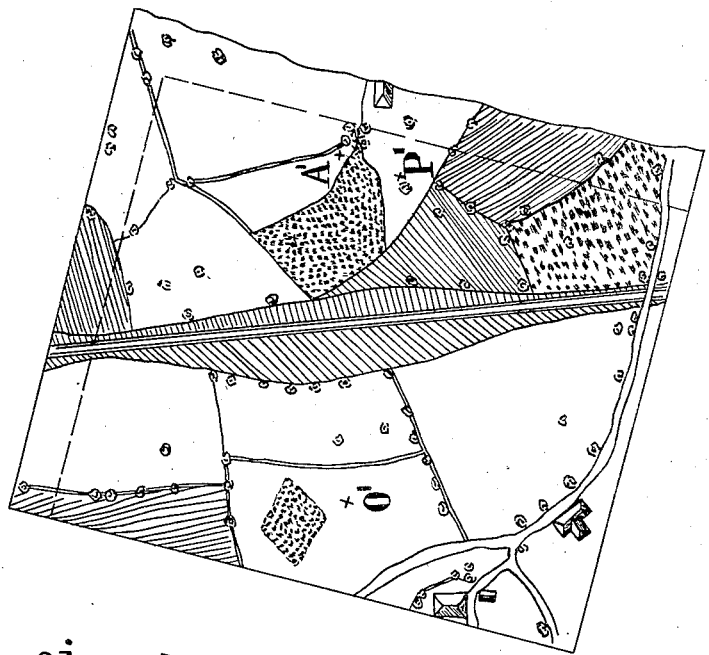
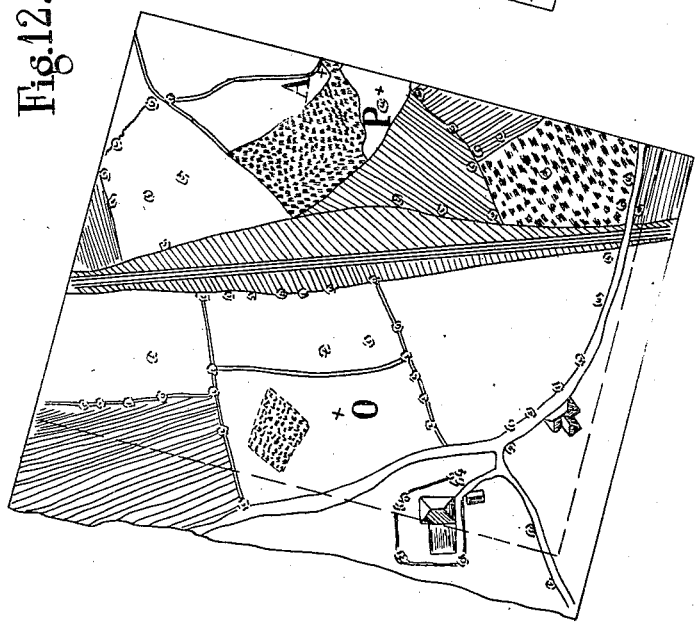
Fig.12.

Patented May 17, 1932

1,858,353

UNITED STATES PATENT OFFICE

ARTHUR CYRIL WEBB ALDIS, OF SPARKHILL, BIRMINGHAM, ENGLAND

APPARATUS FOR USE IN CONNECTION WITH PHOTOGRAPHIC AERIAL SURVEYS

Application filed February 26, 1930, Serial No. 431,551, and in Great Britain March 21, 1929.

In the specification of a previous patent application Serial No. 426,398, filed Feb. 6, 1930, I have described an invention whereby aerial photographs can be rectified to compensate errors due to tilting of the camera axis, these photographs being rectified with the aid of data obtained from a ground survey. In the present specification I am concerned with the production of a series of rectified photographs with the aid of a photograph which has been previously rectified. These photographs are required to be used after rectification in the production of accurate contour maps.

The procedure ordinarily followed in a photographic survey is to fly the aeroplane along a given line and take a succession of overlapping photographs of the country below, such that the centre of each photograph is included well within the area of both the preceding and succeeding photographs. After this line has been traversed, a flight is made along an adjacent line and another series of photographs is taken. This process is repeated until the required area has been covered. If the area has already been surveyed on the ground in the ordinary way, the data obtained in the ground survey can be used in the production of rectified photographs as described in my former specification. But when dealing with unsurveyed country it is obviously desirable to reduce the necessity for a ground survey as much as possible, and to get as much as possible of the data required from the photographs alone.

According to my present invention I can make satisfactory use of a partial ground survey. For example, suppose it is required to make a map of a given area, it would be sufficient for my purpose if the boundaries only of the area were surveyed with the aid of ordinary instruments such as theodolites. By means of data obtained in this survey, I can rectify the photographs of parts of the regions surveyed from the ground, and make use of the photographs thus rectified for rectifying the photographs obtained over the remainder of the territory.

The problem of rectification involves the correction of the photographs to compensate the effect of tilt of the camera axis. It will be understood that if the camera axis were at all times accurately vertical no correction would be required.

My present invention is concerned with ascertaining the error due to tilting from the vertical position of the axis of the camera whereby the successive photographs are taken, and so making it possible to obtain in an expeditious manner photographs in which the error due to camera tilt has been rectified.

According to my invention I place in a stereoscopic apparatus a pair of photographs taken in succession, one of which photographs has been corrected by means of data obtained in a ground survey, whilst the other is the one requiring to be corrected. These photographs are viewed in combination with suitable screens as hereinafter described. After the error due to tilt in the one photograph has been found as a result of this stereoscopic examination, a corrected photograph is taken from it, and this photograph is used for ascertaining (again by stereoscopic examination) the tilt of the next succeeding photograph, the operations being repeated until the whole of the photographs taken in the survey have been corrected for error due to tilting of the camera axis.

For the purpose of elucidating my invention I will first describe an apparatus which I have designed for use in ascertaining the error required to be known, and subsequently I will describe the procedure followed in the use of the instrument and in the production of the elements hereinafter termed "screens".

In the six accompanying sheets of explanatory drawings:—

Figure 1 is a side elevation, Figure 2 a front elevation, and Figure 3 a plan of one form of apparatus constructed for the rectification of aerial photographs in accordance with my invention.

Figure 4 is a sectional front elevation, Figure 5 a front elevation, and Figure 6 a plan to a larger scale than Figures 1-3 of one of the means for supporting in the apparatus a photograph and screen.

Figure 9 is a diagrammatic view of apparatus employed in making from a rectangular screen other screens corresponding to different angles of tilt in the camera axis.

Figure 12 illustrates a pair of successive aerial photographs of a piece of country, the larger parts of the two photographs including a common area.

Figure 13 is a plan illustrating a jig or tool used for marking a critical point on an unrectified photograph after it has been subjected to the process hereinafter described in the apparatus shown in Figures 1–8.

Referring to Figures 1–8, the vertical standard on which are mounted the principal parts of my instrument, comprises a pair of vertical cylindrical pillars $a$, a base $b$ and a top piece $c$. The structure may be stiffened by ties $d$ (Figs. 1 and 3) and an upright rod $e$. At the front of the standard there is arranged a bracket $f$ one end of which can slide in contact with the pillars $a$ through the medium of rollers $g$. The bracket, and the parts carried on it, are counterbalanced by a weight $h$, which is connected to the bracket by a flexible cord or the like $i$ passing over pulleys $j$.

To the top piece $c$ is secured any suitable stereoscope or binocular viewing instrument $k$. The eyes of the observer are placed at $l$.

The upper side of the bracket is formed by a pair of rods $m$ of circular cross section arranged parallel with each other, and on these rods is supported a flat plate $n$ which can be moved about to any required extent on the rods $m$ by either of a pair of handles $o$. Accidental detachment of the plate $n$ from the rods $m$ is prevented by narrow metal strips $p$ arranged beneath the rods $m$ and attached at their ends to the ends of the plate $n$ by pieces $q$.

Figure 7:
Figures 7 and 8 are side elevation and plan showing the means for adjustably securing a photograph on its support.
Figure 8:
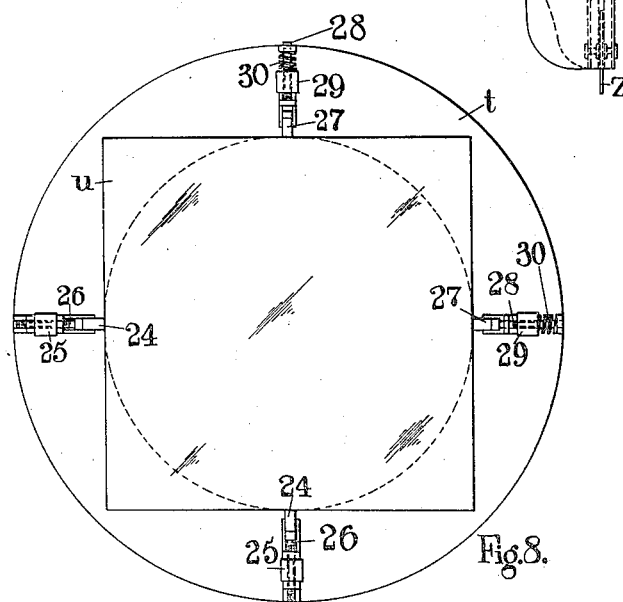

On the upper side of the plate $n$ there are secured at a fixed distance apart a pair of supports for the photographs and screens. As both of the supports are of similar construction, it is only necesary to describe one of them, and this will be done with the aid of Figures 4–8 which show the support to a larger scale than Figures 1–3. The support comprises a main ring which for convenience of construction is made up from two parts $r$, $r'$ (Fig. 4). This ring is fixed to the plate $n$. Within the upper part of the ring there is rotatably carried a ring $s$ to the upper and outer end of which is secured a plate $t$. The plate is formed with an aperture of circular form, and over the aperture is placed a photograph, this being formed or carried on a rectangular glass plate $u$ which is carried on the plate $t$. The glass plate $u$ carrying the photograph may be secured to the plate $t$ by any convenient means. One convenient means is shown in Figures 7–8. At diametrically opposite positions on the plate $t$ are mounted four slidable gripping pieces. Two of them (24) bear against one pair of edges of the plate $u$ and are movable by the engagement of a rotatable nut 25 with a screwed stem 26 on each part 24. The other two grippers (27) are each situated opposite a gripper 24, and on the stem 28 of each is provided an adjustable collar 29 which is acted on by a spring 30. The photographic plate $u$ is held between the grippers 24, 27, and movement of the grippers 24 under the action of the nuts 25 is accompanied by automatic movements of the grippers 27 against or under the action of the springs 30.

The plate $t$ is secured to the ring $s$ and the latter is rotatable within the fixed ring $r$ by a worm $v$ carried on the ring $r$ and engaging worm wheel teeth formed on the ring $s$, a gap being formed in the ring $r$ to accommodate the worm. The ring $s$ is graduated, and the graduations are rendered visible by an aperture $w$ in the ring $r$, one edge of the aperture being chamfered as shown and provided with vernier graduations or any suitable index mark.

At a distance above the plate $t$ is mounted another plate $x$ to the underside of which are attached brackets $y$ carrying roller discs $z$ which rest on a plate 2 situated at a distance beneath the plate $t$. The plate 2 is carried on a flange 3 at the upper side of a ring 4 which is rotatably mounted on the exterior of the ring $r$. Ordinarily only a limited amount of rotation is required in the ring 4 and this is effected by a worm 5 which passes through a gap in the ring 4 and engages worm wheel teeth (not shown) on the exterior of the ring $r$. The rotation of the plate 2 serves for the rotation of the plate $x$, and the required engagement between the plates 2 and $x$ is effected by the provision in the plate 2 of a pair of grooves 20 (Figs. 5 and 6) with which a pair of the discs $z$ can engage. The principal movement required in the plate $x$ is, however, a sliding movement relatively to the plates $t$ and 2, and this is afforded by making the plate 2 of suitable shape and the grooves 20 of suitable length (see Figure 6). If desired a third groove may be provided for engagement by the third roller disc, but ordinarily it is preferable to arrange this disc (the one at the left hand side of Figure 5) to roll on the plain upper surface of the plate 2. This translational movement of the plate $x$ relatively to the plate 2 is effected by a pinion 6 carried on a bracket 7 attached to the plate $x$ and engaging a rack 8 on the underside of the plate 2. The pinion 6 is also movable in an axial direction for disengagement from the rack when it is required to remove the plate $x$.

The function of the plate $x$ is to carry the screen which is placed over the photograph. This screen is formed on or attached to a glass plate 9 carried by a ring 10 which is secured within a ring 11. Proper location of the ring 10 within the ring 11 is effected by a key 60 on the ring 11 engaging a groove in the edge of the ring 10. The ring 11 is formed with a peripheral ridge 12 adapted to be engaged by three grooved rollers 13 carried on the plate $x$. Each roller 13 is attached by a spindle 14 to a slide 15 movable radially on the plate $x$ by a screw 16. The radial movement of the rollers 13 enables them to be moved into and out of engagement with the ridge 12 on the ring 11 for engaging or releasing the ring. Rotation of the ring 11 relatively to the plate $x$ is effected by a finger piece 21 on one of the spindles 14, rotation of the finger piece producing rotation of the roller which in turn rotates the ring and screen.

As is seen in Figures 1–3 two supports such as are shown in Figures 4–8 are secured to the plate $n$ and the rigidity of the interconnection of the two rings $r$ is supplemented by a cross bar 22 which is secured at its ends to the rings $r$.

To the underside of the bracket are secured a plurality of electric lamps 17 which serve to illuminate the photographs, the light being preferably transmitted through translucent screens 18. Beneath the lamps may be arranged a reflector 23.

It will be apparent that all the mobility required to bring a pair of photographs and screens into the required relationship is provided by the above described construction in a very simple and convenient manner. By means of the handles $o$ all the parts carried by the plate $n$ can be moved as a whole on the bars $m$, and the latter can be raised or lowered on the vertical standard by the handle 19 attached to the bracket $f$.

Having thus described the apparatus shown in Figures 1–8, I will now describe the procedure followed in the production of "inclination" screens.

A box 30 (Fig. 9) supported on adjustable levelling screws 31 is provided with an internal support 32 on which is carried with its plane horizontal a screen 33. On its surface the screen bears a system of lines intersecting at right angles like a chess-board pattern as shown by the dotted-line illustration in Figure 10. This screen is illuminated by lamps 34, the light from which passes through a translucent plate or diffuser 35.

At the upper end of the box 30 is pivoted a camera 36 in which is secured at right angles to the axis of the camera a photographic plate 37 on to which it is required to photograph a copy of the screen 33. This plate 37 is conveniently of circular form. The axis 38 of the pivot of the camera is horizontal and intersects the longitudinal axis of the camera and also the view point or nodal point of the lens which is situated in the part 39. The arrangement enables the longitudinal axis to be rocked about the pivot to any required position. Also the box is made telescopic, or any other provision is made whereby the distance of the lens from the screen 33 may be suitably adjusted. The focal length of the lens is such that it produces on the plate 37 an image of the screen 33 to a conveniently reduced scale, and the distance from the view point of the lens to the plate 37 is exactly the same as the focal length of the lens of the camera used in making the aerial photographs.

Figure 10:
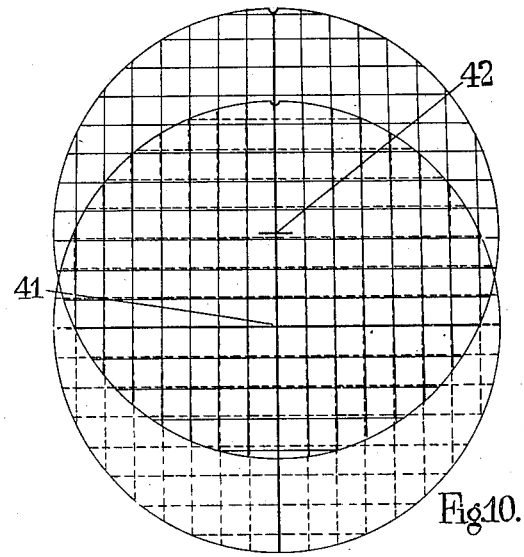
Figure 10 is a diagram representing the appearance of two screens; the one in dotted lines corresponds to a screen of rectangular pattern when viewed at right angles to the plane of the pattern, whilst the one in full lines shows how the same pattern would appear when viewed along an axis less than a right angle.

The screen 33 is preferably marked with a pair of heavy lines across its centre at right angles to each other as will be seen in Figure 10. Also a centre mark is made on the photographic plate 37 indicating the camera axis. The plate 37 is located in the camera by the key 40 which engages a notch in the plate 37. It will be apparent that by means of such an apparatus a photograph can be taken of the screen 33 with the axis of the camera normal to the screen 33, or at any required inclination thereto. A series of such photographs are taken, these forming the "inclination" screens previously mentioned and to be described again later. Also a series of screens are made with the camera axis vertical and with the camera situated at different distances from the screen 33. These screens are herein termed "scale" screens.

Figure 11:
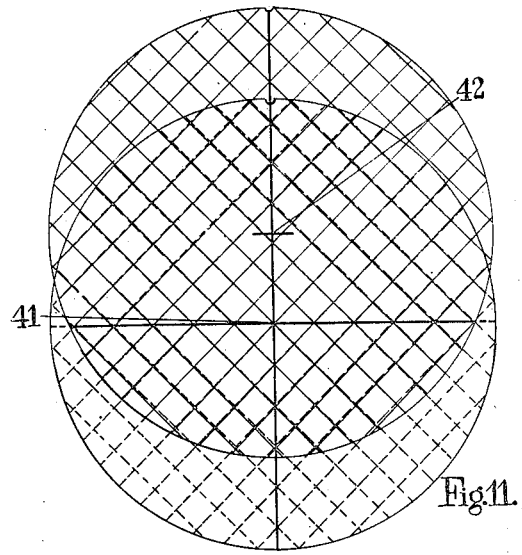
Figure 11 is a similar view to Figure 10 representing the appearance of a rectangular screen and an "inclination" screen in which the lines forming the pattern are at 45° to the horizontal diameter of the screen.
Figure 6:
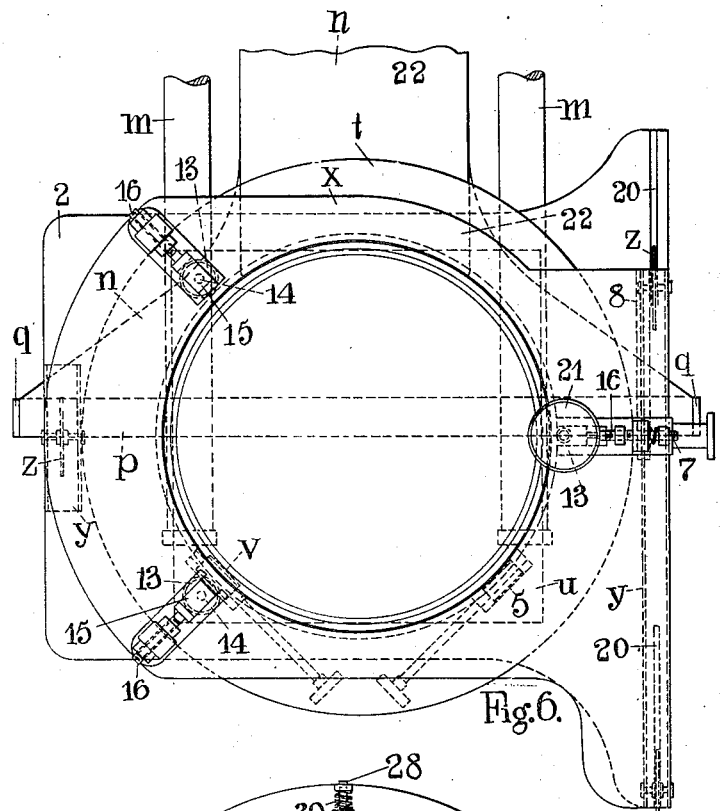

Referring to Figure 10, the dotted lines in the lower circle show the appearance of a rectangular screen obtained when the axis of the camera 36 is normal to the screen 33, and the full lines in the upper circle show how the rectangular pattern appears when the axis of the camera is tilted at a considerable angle to the normal. The first named illustration is herein termed a "zero inclination" screen, and the second is termed an "inclination" screen. As already stated, a series of inclination screens are produced and the inclination to which each corresponds is suitably marked on the screen. On each inclination screen there appears plainly marked not only the intersection of the central diametral lines 41, but also a mark 42 corresponding to the axis of the camera which is at the centre of the screen. The distance between the mark 42 and the intersection of the lines 41 will vary with the inclination, as will also the "distortion" of the pattern forming the screen. Figure 11 is a similar view to Figure 10 showing an alternative arrangement of the screen lines, these being disposed at 45° to the horizontal centre line.

I will now give a brief description of certain features of the illustration of a pair of aerial photographs shown in Figure 12. This figure shows typical ground detail in a pair of photographs forming a stereoscopic pair. The dotted lines indicate what is termed the overlap area, and it will be noted that within this area the same photographic detail is shown, and approximately the two overlap photographs may be said to present the same picture to the eye. In the left hand photograph there is marked by a cross at O the camera axis which in this photograph (because there is no tilt in the camera axis) coincides with the point herein termed the "plumb" point, that is to say a point on the ground vertically below the camera lens. In the right hand photograph the point corresponding to the position of the camera axis is indicated by the cross at A'. This point occurs at a different position in the photograph mainly owing to the fact that the camera has been moved by the aeroplane to a new position, and in a much less degree to tilting of the camera axis. Other points P A in the left hand photograph and O' P' in the right hand photograph will be mentioned later.

I will now proceed to describe the essential facts connected with stereoscopic vision on which my invention depends. Let us suppose in the first instance that a photograph is taken from an aeroplane of flat country beneath, and that on the ground there is drawn a chess board pattern in white lines. Also let it be assumed that the camera axis is vertical. The photograph obtained in this way will contain a picture of the ground detail, and on the picture will appear a system of lines intersecting at right angles.

Now let it be supposed that the aeroplane has moved through a certain distance, and that another photograph is taken but with the camera axis tilted from the vertical. The common area included by the two photographs will contain the chess board pattern, but in the second photograph the lines will not intersect at right angles, the pattern being slightly distorted owing to the tilt of the camera.

The important and essential fact to be recognized is that within the limits of camera tilt which occur in practice, these two photographs can be viewed stereoscopically as a single picture, and notwithstanding the distortion in the lines in one of the photographs only one set of intersecting lines will be seen lying on the ground detail.

It follows that if on one of a pair of ordinary photographs viewed in a stereoscope a screen be placed bearing a system of lines intersecting at right angles, and if on the other photograph in the stereoscope there be placed a screen bearing a system of lines distorted in a manner which corresponds exactly with a photograph of lines drawn on the ground, then the lines forming the two screens will be seen stereoscopically as a single screen superimposed on the ground below, provided that the two screens and the photographs are suitably correlated as hereinafter described.

Consequently, according to the present invention, I employ when viewing the photographs stereoscopically, a pair of screens, one of rectangular form placed on a rectified photograph (or a photograph in which there is no camera tilt), and a suitably distorted screen placed on the other photograph which contains the tilt error to be ascertained.

From the foregoing it will now be readily understood, that if a rectangular screen be placed on each photograph the two screen patterns cannot be combined in a single image lying in one plane, but parts of the intersecting lines will be seen as lying nearer and further from the observer.

It is convenient at this stage to mention an important fact, namely, that variations in the height above the ground at which successive photographs are taken will make it impossible to obtain the above condition, irrespective of camera tilt, and consequently it is necessary to place on the so called corrected photograph a screen of suitable scale, suitably related to relative height at which the photograph was taken. When this condition is satisfied no difficulty is experienced in satisfying the required conditions.

Proceeding now to a description of the method employed in using the apparatus shown in Figures 1 to 8, it will be understood that the observer is provided with a set of screens corresponding to different inclinations of the camera axis. Also he is provided with a corresponding series of rectangular screens of varying scale.

In the first place an uncorrected photograph is placed on the right hand support, and on the left hand support is placed a photograph which has been previously corrected, or contains no error due to camera tilt. These two photographs after having been placed in their respective supports are brought into suitable relationship for stereoscopic vision as shown in Figure 12. As regards the left hand photograph the cross marked at O is by means of the adjustment mechanism shown in Figures 7, 8 made to coincide accurately with the axis of rotation of the part $s$ (Figure 4) and likewise the corresponding cross marked A' in the right hand photograph is similarly centered on its part $s$. Both of the said parts $s$ are now rotated relatively if necessary to enable the two photographs to combine stereoscopically when viewed through the stereoscope k.

The observer next places a zero inclination screen in the right hand screen holder 10 and the pinion 6 is operated to bring the corresponding scale to zero. This automatically causes the centre of the screen to coincide with the point A' in the photograph beneath. On the left hand screen holder the observed then places a rectangular "scale" screen corresponding to the relative height for this photograph. He then, by means of the various sliding and rotational motions provided in the apparatus, brings the left hand screen into such a relationship to the photograph that the two screen patterns are seen stereoscopically as one pattern, in so far as this is possible in spite of distortions in the right hand photograph due to camera tilt. It will be found, however, that it will not be possible to see a single screen pattern of intersecting lines at all parts, and the amount and position of the divergence towards the margins of the screens gives the observer an indication of the amount of error due to tilt and also of its direction.

The observer now in accordance with this indication selects a suitable inclination screen, and after removing the zero inclination screen from the right hand support, replaces it by the selected inclination screen. By means of the various movements associated with the support he brings the centre of the screen over A', and he arranges the axis of the screen (which passes through this point) to lie in the estimated direction of tilt. He now re-adjusts his left hand screen by means of the sliding and rotational adjustments provided, and if he has in fact chosen the correct "inclination" screen he will have no difficulty in producing the appearance of a single screen pattern on or near the ground below. If he fails to obtain this effect, another inclination screen is chosen until the desired result is obtained.

When the correct screen is chosen and is properly placed, the centre of the screen pattern, as indicated by the intersection of the heavy cross lines in Figures 10 and 11, will be superimposed on the true plumb point of the photograph. This is the point which it is desired to find and mark on the photograph, the point being indicated by P' in Figure 12. The distance of this point P' from A' is given by the screen, being the distance between the marked centre 42 of the screen and the intersection 41 of the cross lines.

To enable the plumb point to be marked on the photograph I employ a jig or tool as shown in Figure 13. This consists of a plate 50 which is adapted to fit the screen holder 10 after the screen has been removed. It is provided with a location notch 51 which enables it to be placed in exactly the same position as the screen, and it carries a movable slide 54 secured between guides 52, one of which is graduated. In the slide is formed a hole 53, and by means of the rack 55, pinion 56, and finger piece 57 the hole can be moved to a distance from the centre equal to the distance between the points 41 and 42 on the inclination screen. The hole then lies over the plumb point P' on the right hand photograph, and a mark is made on the photograph at that point by means of a drill or other tool inserted through the hole.

The photograph is now ready to be transferred to a correcting apparatus such as is described in the specification of my earlier patent application where a photograph corrected for camera tilt is obtained. In the said apparatus the photograph bearing the plumb point mark obtained in the manner herein described is placed in a suitably inclined relation to the axis of a camera and is re-photographed. This corrected photograph is used in a similar manner to that above described for finding the correct position of the plumb point in the next photograph of the series, and the operations are repeated throughout the series.

In brief, and summarizing the above description, the process of ascertaining the error due to tilt, by my invention, is to place a photograph having no error, or a corrected photograph, with a rectangular "scale" screen on one side of the apparatus, and the photograph possessing an error due to tilt, together with a suitable "inclination" screen on the other side of the apparatus. After making suitable adjustments in the relative positions of the photographs and screens, the two are viewed stereoscopically. If the correct inclination screen has been chosen then the two screens will be seen, when viewed stereoscopically, as a single pattern of intersecting lines. If the correct inclination screen has not been chosen, it is replaced in succession by others until this result is obtained. The error due to tilt is then known from the inclination screen, and the required mark is then made on the photograph by means of the jig.

By this invention I am able to effect the estimation of error due to camera tilt in a very simple and expeditious manner, and to avoid the tedium and risk of inaccuracy which are ordinarily present when the error is ascertained, as heretofore, by mathematical computations.

Whilst for the purpose of convenience, I have described the corrected photograph as being placed on the left hand support and the uncorrected photograph on the right hand support these positions may be reversed. Also subordinate details in the apparatus shown in the accompanying drawings may be varied to meet different requirements.

Having thus described my invention what

I claim as new and desire to secure by Letters Patent is:—

1. In apparatus for ascertaining the amount of error due to camera tilt in aerial photographic surveys, the combination comprising a stereoscope, means for supporting a pair of aerial photographs, one of which is a rectified photograph containing no error due to camera tilt, whilst the other is an uncorrected photograph, a pair of screens of similar pattern one of which is appropriate to and is placed on the rectified photograph, whilst the other corresponds to a known angle of tilt and is placed on the uncorrected photograph, and means for correlating the photographs and screens, substantially as described.

2. In apparatus for ascertaining the amount of error due to camera tilt in aerial photographic surveys, the combination comprising a stereoscope, means for supporting a corrected and an uncorrected photograph, a "scale" screen corresponding to the ratio of the heights at which the two photographs were taken arranged on the corrected photograph, an "inclination" screen of similar pattern to the scale screen arranged on the uncorrected photograph and means for correlating the photographs and screens, substantially as described.

3. In apparatus for ascertaining the amount of error due to camera tilt in aerial photographic surveys, means comprising a set of rectangular screens of different scales corresponding to percentage variations of flying heights, and a set of "inclination" screens corresponding to different inclinations of the camera axis at a fixed height, and means for viewing stereoscopically one of each of such screens in combination with a corrected and an uncorrected photograph respectively, substantially as described.

4. In means for ascertaining the amount of error due to camera tilt in aerial survey photographs, the combination comprising a photograph possessing no error due to camera tilt, a "scale" screen of rectangular pattern superimposed on said photograph, an uncorrected photograph, an inclination screen corresponding to a tilted rectangular pattern superimposed on the uncorrected photograph, means for effecting relative adjustments of the screens and photographs, and means for viewing the screens and photographs stereoscopically, substantially as described.

5. In means for ascertaining the amount of error due to camera tilt in aerial survey photographs, the combination comprising a photograph possessing no error due to camera tilt, a "scale" screen of rectangular pattern superimposed on said photograph, an uncorrected photograph, an inclination screen corresponding to a tilted rectangular pattern superimposed on the uncorrected photograph, means for effecting relative adjustments of the screens and photographs, a pair of rigidly interconnected supports for the photographs and screens, and means for viewing the screens and photographs stereoscopically, substantially as described.

6. In means for ascertaining the amount of error due to camera tilt in aerial survey photographs, the combination comprising a photograph possessing no error due to camera tilt, a "scale" screen of rectangular pattern superimposed on said photograph, an uncorrected photograph, an inclination screen corresponding to a tilted rectangular pattern superimposed on the uncorrected photograph, means for effecting relative adjustments of the screens and photographs, a pair of supports for the photographs and screens, each support comprising a fixed ring, a plate in rotatable connection with the ring for carrying a photograph, and a plate in slidable and rotatable connection with the ring for carrying a screen, and means for viewing the screens and photographs stereoscopically, substantially as described.

In testimony whereof I have signed my name to this specification.

ARTHUR CYRIL WEBB ALDIS.